(12) United States Patent
Niepoth et al.

(10) Patent No.: US 11,084,908 B1
(45) Date of Patent: Aug. 10, 2021

(54) PROCESS FOR PREPARING A POLYMER POWDER

(71) Applicant: Evonik Operations GmbH, Essen (DE)

(72) Inventors: Peter Niepoth, Gross-Umstadt (DE); Verena Melk, Weiterstadt (DE); Andrea Engel, Birmingham, AL (US)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 17/271,342

(22) PCT Filed: Aug. 7, 2019

(86) PCT No.: PCT/EP2019/071168
§ 371 (c)(1),
(2) Date: Feb. 25, 2021

(87) PCT Pub. No.: WO2020/043448
PCT Pub. Date: Mar. 5, 2020

(30) Foreign Application Priority Data

Aug. 31, 2018 (EP) .................... 18191923

(51) Int. Cl.
| | | |
|---|---|---|
| *C08J 3/12* | (2006.01) | |
| *F26B 5/04* | (2006.01) | |
| *F26B 3/30* | (2006.01) | |
| *F26B 5/06* | (2006.01) | |

(52) U.S. Cl.
CPC ............. *C08J 3/124* (2013.01); *F26B 3/30* (2013.01); *F26B 5/044* (2013.01); *F26B 5/06* (2013.01); *C08J 2333/08* (2013.01)

(58) Field of Classification Search
CPC .......... C08J 3/124; C08J 2333/08; F26B 3/30; F26B 5/044; F26B 5/06
See application file for complete search history.

(56) References Cited

U.S. PATENT DOCUMENTS

| | | | | |
|---|---|---|---|---|
| 3,970,633 | A | * | 7/1976 | Miller ...................... C08F 8/44 |
| | | | | 524/558 |
| 5,326,572 | A | | 7/1994 | Mehra et al. |
| 5,644,011 | A | | 7/1997 | Lehmann et al. |
| 2005/0168800 | A1 | * | 8/2005 | Hiraoka ................. G02F 1/167 |
| | | | | 359/296 |
| 2010/0272669 | A1 | | 10/2010 | Malessa et al. |
| 2018/0000946 | A1 | | 1/2018 | Lee et al. |

FOREIGN PATENT DOCUMENTS

| | | |
|---|---|---|
| EP | 0 388 954 | 9/1990 |
| EP | 3 241 546 | 11/2017 |

OTHER PUBLICATIONS

International Search Report dated Oct. 30, 2019 in PCT/EP2019/071168.
Written Opinion dated Oct. 30, 2019 in PCT/EP2019/071168.
Schmidt, et al., "*Pharmazeutische Hilfsstoffe: Eigenschaften, Anwendung and Handelsprodukte,*"chapter 6.4, p. 111 eBook, Govi-Verlag Pharmazeutischer Verlag GmbH, Eschborn (Germany) 2013, 5 pages.

* cited by examiner

*Primary Examiner* — Patrick D Niland
(74) *Attorney, Agent, or Firm* — Grüneberg and Myers PLLC

(57) ABSTRACT

A process prepares a polymer powder, with a D50 particle size from 40 to 200 μm and a Hausner factor of 1.25 or less, by freeze drying and subsequent loosening up of an aqueous polymer dispersion containing 15 to 50% by weight of a polymer. The polymer is polymerized from 10 to 30% by weight of methyl methacrylate, 50 to 70% by weight of methyl acrylate, and 5 to 15% by weight of methacrylic acid.

20 Claims, No Drawings

PROCESS FOR PREPARING A POLYMER POWDER

CROSS-REFERENCE TO RELATED APPLICATIONS

This application is the National Stage entry under § 371 of International Application No. PCT/EP2019/071168, filed on Aug. 7, 2019, and which claims the benefit of European Application No. 18191923.4, filed on Aug. 31, 2018. The content of each of these applications is hereby incorporated by reference in its entirety.

FIELD OF THE INVENTION

The invention discloses a process for preparing a polymer powder, with a D50 particle size from 40 to 200 µm and a Hausner factor of 1.25 or less from an aqueous polymer dispersion comprising 20 to 50% by weight of a polymer polymerized from 10 to 30% by weight methyl methacrylate, 50 to 70% by weight methyl acrylate and 5 to 15% by weight methacrylic acid, by freeze drying and subsequent loosen up.

BACKGROUND

U.S. Pat. No. 5,644,011 describes a coating and binder composition for pharmaceutical agents. The coating or binder is a (meth)acrylate copolymer produced by emulsion polymerization in the form of an aqueous dispersion and may have a composition of (A) about 10-25 wt.-% methacrylic acid, (B) about 40-70 wt.-% methyl acrylate, and (C) 20-40 wt.-% methyl methacrylate, based on a total copolymer weight of 100 wt.-%.

EUDRAGIT® FS 30 D is a well-known commercially available (meth)acrylate copolymer product for pharmaceutical applications in the form of a 30% by weight aqueous dispersion. The copolymer is polymerized from 10% by weight methacrylic acid, 65% by weight methyl acrylate, and 25% by weight methyl methacrylate and thus corresponds to U.S. Pat. No. 5,644,011 example B2. The molecular weight is about 280,000 g/mol. It is recommended to store the product between 5 and 10° C. and to protect from freezing. Although EUDRAGIT® FS 30 D is available for decades, no corresponding powder products are available on the market up to now.

In Schmidt, P. C. and Lang S. (ISBN 978-3-7741-1298-8, eBook, Govi-Verlag Pharmazeutischer Verlag GmbH, Eschborn (Germany) 2013) *"Pharmazeutische Hilfsstoffe: Eigenschaften; Anwendung and Handelsprodukte*, chapter 6.4, p. 111, it is mentioned that the polymethylacrylate-co-methylmethacrylate-co-methacrylic acid copolymer (INCI: Acrylates Copolymer, Drug Master File 13941 (USA) and Canada DMF 2006-176, CAS 26936-24-3, corresponding to EUDRAGIT® FS 30 D) obtained after freeze drying of the dispersion shows a glass transition temperature of about 43° C.

SUMMARY OF THE INVENTION

Powder products may have in general some advantages and disadvantages over aqueous dispersion products. Usually, powder products have the advantage that they are less prone to microbial contamination and less in weight compared to a dispersion. Thus, it is often easier to store and to transport powder products. Since different customers may have different needs, there is a demand in the market for powder products and dispersions as well. Although a EUDRAGIT® FS 30 D dispersion is now available for decades, no corresponding powder products are available on the market up to now. It is known in principle that it is possible to obtain the polymer for analytical characterization purposes from EUDRAGIT® FS 30 D dispersions by freeze-drying. However no detailed process is known that allows to provide a powder product from a EUDRAGIT® FS 30 D dispersion at pharmaceutically acceptable quality, where the process can be performed at large scale and under GMP (Good Manufacturing Practice) conditions. Thus, there is a need to provide such a process.

The invention discloses a process for preparing a polymer powder with a D50 particle size from 40 to 200, preferably from 45 to 120 µm, and a Hausner factor of 1.25 or less from an aqueous polymer dispersion comprising 15 to 50% by weight of a polymer polymerized from 10 to 30% by weight methyl methacrylate, 50 to 70% by weight methyl acrylate and 5 to 15% by weight methacrylic acid, by freeze drying and subsequent loosen up, comprising the process steps a) filling the aqueous polymer dispersion in one or more bowls with a volume/surface relation from 0.5 to 3.0 g/cm², preferably 1 to 2.5 g/cm², b) freezing the one or more bowls filled with the aqueous polymer dispersion to a temperature of minus 35 to minus 50° C., preferably of minus 38 to minus 45° C., c) freeze drying of the frozen aqueous polymer dispersion in the bowls to a powder at a vacuum in the range of about 3 to 0.05, preferably 0.8 to 0.1 mbar and a temperature in the range of 20° C. and up to no more than the glass transition temperature Tg of the polymer and until the water is removed to a LOD of 1% or less.

d) obtaining the freeze dried polymer powder from the one or more bowls, e) loosen up the freeze dried polymer powder by passing through a sieve, preferably with a mesh width from about 300 to 1000 µm, to obtain the polymer powder with a D50 particle size from 40 to 200 µm and a Hausner factor 1.25 or less, preferably from 1.1 to 1.25.

DETAILED DESCRIPTION OF THE INVENTION

Polymer

The Polymer as disclosed is polymerized from 10 to 30% by weight methyl methacrylate, 50 to 70% by weight methyl acrylate and 5 to 15% by weight methacrylic acid.

The polymer dispersion as disclosed may preferably comprise 15 to 50% by weight of a polymer polymerized from 20 to 30% by weight methyl methacrylate, 60 to 70% by weight methyl acrylate and 8 to 12% by weight methacrylic acid. Most preferred the polymer is polymerized from 25% by weight methyl methacrylate, 65% by weight methyl acrylate and 10% by weight methacrylic acid. A 30% by weight aqueous dispersion of a polymer polymerized from 25% by weight methyl methacrylate, 65% by weight methyl acrylate and 10% by weight methacrylic acid corresponds to the commercial product EUDRAGIT® FS 30 D.

The percentages of the monomers add up to 100%.

Aqueous Polymer Dispersion

In step a), the aqueous polymer dispersion to be freeze-dried is filled in one or more bowls.

The aqueous polymer dispersion comprises water and polymer particles dispersed therein. In particular, the aqueous polymer dispersion comprises 15 to 50, preferably 25 to 40% by weight of a polymer polymerized from 10 to 30% by weight methyl methacrylate, 50 to 70% by weight methyl acrylate and 5 to 15% by weight methacrylic acid.

Preferably, the aqueous polymer dispersion may comprise 15 to 50, preferably 25 to 40% by weight of a polymer polymerized from 20 to 30% by weight methyl methacrylate, 60 to 70% by weight methyl acrylate and 8 to 12% by weight methacrylic acid.

The aqueous dispersion may also comprise small amounts, 0.1 to 2% by weight, of further pharmaceutical acceptable excipients like preservatives against microbiological contamination or stabilizers respectively emulsifiers for avoiding coagulation of the polymer particles.

Bowls

In step a), the aqueous polymer dispersion is filled in one or more bowls (trays) with a volume/surface relation from 0.5 to 3.0 g/cm$^2$, preferably 1 to 2.5 g/cm$^2$. As long as the volume/surface relation is within the given range, the filling volume of the bowls can be adjusted to practical needs e.g. to optimize transport and handling. A suitable filling volume for large scaled freeze drying equipment may be in the range from 1 to 20 or 2 to 8 liter per bowl. A number of bowls, may be up to 10 or 300 may be placed in one large-scale freeze drying equipment respectively in its freeze-drying chamber.

A bowl may be defined as a container, which is open on the upper side. The bottom is usually even and has a larger area than the side parts. The one or more bowls may, in other words, also be designated as (upper side open) trays, boxes, dishes, cases or chests. The one or more bowls have the function as open container(s) or tray(s) with excellent heat conductivity for the polymer dispersion in process steps a) to d). The form of the one or more bowls may be in principle free as long there is an upper open side, where the water of the dispersion can pass off during the freeze-drying process. For practical reasons the form of the one or more bowls may be chosen more or less flat with the upper side open. Preferably, an essentially rectangular geometry is useful for providing an effective use of the available space in the chamber to the freeze-drying apparatus and a comparative large surface area for effective, less time consuming, removal of the water during the freeze-drying process.

For example, suitable bowls may have geometrical dimensions, preferably rectangular dimensions in length, width and height, of about 10 to 100 cm in length, 10 to 100 cm in width and 1 to 10 cm in height, preferably dimensions of about 30 to 100 cm in length, 10 to 70 cm in width and 2 to 8 cm in height. In the inventive example 3 rectangular dimensioned bowls of 60 cm in length, 41 cm in width and 3 cm in height were used. When the height of the filling is 2 cm, the total filling volume is theoretically calculated 4920 ml. Practically, about 5 kg or 5 liter EUDRAGIT® FS 30 D dispersion can be filled in one of such kinds of bowls.

In step a), the aqueous polymer dispersion is filled in one or more bowls with a volume/surface relation from 0.5 to 3.0 g/cm$^2$. A volume/surface relation from 0.5 to 3.0 g/cm$^2$ means that the height of the filling is from 0.5 to 3 cm.

The one or more bowls may provide a volume/surface relation for the polymer dispersion relation from 0.5 to 3.0 g/cm$^2$, preferably from 1.0 to 2.5 g/cm$^2$. This allows effective freezing of the one or more bowls filled with the aqueous polymer dispersion and effective removal of the water during the freeze-drying process.

Preferably, the bowls are made from a material, which does not interact with or contaminate the polymer material. The bowls should be chemically resistant to alkaline detergents and the acidic polymer dispersion. Preferred materials are ceramic or steel, preferred is stainless steel.

Mesh

In a preferred embodiment the bowls are covered at least in step b) or in step c) or both with a mesh. The mesh prevents that polymer particles are entrained from dried material in the bowls and are contaminating the freeze-drying equipment during the freeze-drying process by flying around. Suitable materials may be cellulose, polyethylene or preferred metal (steel). The preferred mesh width may be about 10 to 100 µm, preferably about 20 to 50 µm. Betamesh® 50 is a suitable mesh.

Freezing

In step b), the one or more bowls filled with the aqueous polymer dispersion are frozen to a temperature of minus 35 to minus 50° C., preferably of minus 38 to minus 45° C. The freezing time may be between 3 and 24 hours.

Freeze Drying

In step c), the freeze drying of the frozen aqueous polymer dispersion to a powder is performed in the bowls at a vacuum in the range of about 3 to 0.05 mbar, preferably 0.8 to 0.1 mbar, and at a temperature in the range from about 20° C. and up to no more than the glass transition temperature Tg of the polymer and until the water is removed to a LOD of 1% or less.

Step c) is preferably performed in a freeze-drying chamber. The heating of the freeze drying chamber may be effected by integrated floor space heating equipment or by an infrared heat equipment.

The processing time depends on the equipment used and amount of dispersion to be freeze-dried. Usually the process may take about 6 to 65 hours, preferably about 6 to 24 hours.

Standard freeze-drying equipment may be used. The freeze-drying equipment should preferably be equipped with a freeze-drying chamber. Preferably, the heating of the freeze-drying chamber is effected by integrated floor space heating equipment or by an infrared heat equipment.

Vacuum

Freeze-drying of the frozen aqueous polymer dispersion in step c) is performed at a vacuum in the range of about 3 to 0.05 mbar, preferably 0.8 to 0.1 mbar. If the vacuum is too low, e.g. less than 0.05 mbar, the processing time may become too long and uneconomic. If the vacuum is too high, e.g. more than three mbar, the drying energy may be too low for efficient drying of the product.

Glass Transition Temperature Tg [° C.]

Freeze-drying of the frozen aqueous polymer dispersion in step c) is performed at a temperature in the range of 20° C. and up to no more than the glass transition temperature Tg of the polymer. The upper limit of the freeze-drying temperature should not exceed the glass transition temperature Tg of the polymer since otherwise polymer particles may be sintered or baked together which may result in an uneven and unusable product with inhomogeneous particle size and particle size distribution. On the other hand, the lower limit of the freeze-drying temperature should not be less than 20° C., preferably not less than 30° C. or 35° C. because otherwise the process time may become too long and thus uneconomic.

The glass transition temperature of a polymer polymerized from 25% by weight methyl methacrylate, 65% by weight methyl acrylate and 10% by weight methacrylic acid is 43° C. Thus, freeze-drying of this specific polymer is preferably performed at a temperature in the range from 20 to 43° C., preferably in the range from 35 to 42° C.

The glass transition temperature Tg may be determined by DSC according to DIN EN ISO 11357 (−1:2017-02). Typically, between 10 and 12 mg sample, and a heating rate of 20 K/min was used; the temperature range was −40° C. to 140° C. The measurement is carried out under nitrogen atmosphere. The evaluation was based on the second heating cycle, and the indicated value is the mean value in the glass transition interval.

Loss On Drying (LOD)

In step c) of the process as disclosed the freeze drying of the frozen aqueous polymer dispersion to a powder is performed in the bowls at a vacuum in the range of about 3 to 0.05, preferably 0.8 to 0.1 mbar and at a temperature in the range from 20° C. and up to no more than the glass transition temperature Tg of the polymer and until the water is removed to a LOD (Loss on drying) of 1% or less.

The LOD water content may be determined according to the United States Pharmacopeia 40 (USP) chapter <921> Method III (Gravimetric) and procedure for chemicals— proceed as directed in the individual monograph preparing the chemical as directed under Loss on Drying (LOD)<731> and also according European Pharmacopeia 7.0 (EP) chapter 2.2.32.

Particle Size

A highly suitable measuring method for determination of particle size distribution is laser refraction. Commercial instruments permit measurement in air (Malvern Co. S3.01 Particle Sizer) or preferably in liquid media (LOT Co., Galai CIS 1). The prerequisite for measurement in liquids is that the polymer does not dissolve therein or the particles do not change in some other way during the measurement. An example of a suitable medium is a highly diluted (about 0.02%) aqueous Polysorbate 80 solution.

Light Diffraction

The determination of the particle size may be performed according to the United States Pharmacopeia 36 (USP) chapter <429> and European Pharmacopeia 7.0 (EP) chapter 2.9.31. The particle size distribution was determined utilizing a laser scattering instrument (e.g. Fa. Sympatec GmbH, type HELOS equipped with RODOS dry dispersing unit). The laser diffraction method is based on the phenomenon that particles scatter light in all directions with an intensity pattern that is dependent on particle size. A representative sample, dispersed at an adequate concentration in a suitable liquid or gas, is passed through the beam of a monochromic light source, usually from a laser. The light, scattered by the particles at various angles, is measured by a multi-element detector, and numerical values relating to the scattering pattern are then recorded for subsequent analysis. The numerical scattering values are then transformed, using an appropriate optical model and mathematical procedure, to yield the proportion of total volume to a discrete number of size classes forming a volumetric particle size distribution (e.g. D50 describes a particle diameter corresponding to 50% of cumulative undersize distribution).

Dry samples were transferred into aerosols by use of powder dispersers, which apply mechanical forces for deagglomeration. The dosing device feeds the disperser with a constant mass flow of sample. The disperser utilizes the energy of compressed gas (e.g. 2 bar) or the differential pressure to a vacuum (e.g. 90 to 100 mbar) to disperse the particles. The required precision of the method is dependent on characteristics of the sample material (milled versus non-milled, robust vs. fragile). Appropriate measurement conditions are experimentally established, in relation to the desired precision. At least a triplicate detection of representative samples was conducted. The repeatability of the particle size distribution parameter was as follows: for any central value of the distribution (e.g. median D50), the coefficient of variation was less than 10%. For values away from the median (e.g. D10 and D90), the coefficient of variation did not exceed 15%. Below a particle size of 10 μm, the coefficient of variation was doubled.

Hausner Factor

The Hausner factor is the quotient of Tapped density/Bulk density. A Hausner factor of 1.25 or less may characterize a condition where a powder is loose and free flowing. The polymer powder as disclosed may show a tapped density from 0.45 to 0.55, preferably from 0.48 to 0.52 g/ml. The polymer powder as disclosed may show a bulk density from 0.35 up to less than 0.45, preferably from 0.38 to 0.42 g/ml.

Bulk Density/Tapped Density

The determinations of the bulk or the tapped density may be performed according to the United States Pharmacopeia 36 (USP) chapter <616> and the European Pharmacopeia (EP) chapter 2.9.15. The interparticulate interactions that influence the bulk properties of a powder are also the interactions that interfere with the powder flow, a comparison of the bulk and tapped densities can give a measure of the relative importance of these interactions in a given powder. The bulk density of the powder is determined "as poured" or passively filled into a measuring vessel. The tapped density is a limiting density attained after "tapping down", usually in a device that lifts and drops a volumetric measuring cylinder containing the powder a fixed distance.

Bulk Density

The bulk density is determined by measuring the volume of a known mass of powder sample that has been passed without agglomeration into a graduated cylinder (Method I) or through a volume-measuring apparatus into a cap (Method II). For the purposes of the described invention, only Method I was utilized for bulk density determinations.

Tapped Density

The tapped density is achieved by mechanically tapping a measuring cylinder containing a powder sample. After observing the initial volume, the cylinder is mechanically tapped, and volume readings are taken until only a little volume change is observed. The mechanical tapping is achieved by raising the cylinder and allowing it to drop under its own weight a specified distance.

Polymer Powder

Disclosed is a process for preparing a polymer powder, with a D50 particle size from 40 to 200 μm, preferably 45 to 120 μm and a Hausner factor of 1.25 or less from an aqueous polymer dispersion.

In step d), the freeze-dried polymer powder is obtained, taken out off, preferably by means of an applicator or shovel, from the one or more bowls.

In step e), the freeze dried polymer powder is loosened up by passing through a sieve, preferably with a mesh width from about 300 to 1000 μm, to obtain the polymer powder with a D50 particle size from 40 to 200 μm and a Hausner factor of 1.25 or less, preferably from 1.1 to 1.25.

Preferably, the polymer powder may have a particle size D10 of 10 to 25 μm, D50 of 45 to 90 μm and D90 of 120 to 180 μm.

The residual water content in the polymer powder obtained from the freeze-drying step c) is characterized by a LOD of 1.0% or less, preferably of 0.2 to 0.8%.

EXAMPLES

Analytical Methods

Bulk Density

The bulk density was determined according to the United States Pharmacopeia 36 (USP) chapter <616> and the European Pharmacopeia (EP) chapter 2.9.15 by measuring the volume of a known mass of powder sample that has been passed without agglomeration into a graduated cylinder (Method I).

Into a 100 ml (readable to 1 mm) cylinder, without compacting, an apparent volume between 50 ml and 100 ml is introduced, weighted [M] with 0.1% accuracy. The powder sample is leveled carefully without compacting, if necessary, and the apparent unsettled volume [V$_0$] is read to the nearest graduated unit. The bulk density is calculated in gram per milliliter [g/ml], by the formula:

$$\rho_{bulk} = \frac{M}{V_0}$$

Tapped Density

The Tapped density was determined according to the United States Pharmacopeia 36 (USP) chapter <616> and European Pharmacopeia (EP) chapter 2.9.15 by mechanically tapping a measuring cylinder containing a powder sample.

Into a 100 ml (readable to 1 ml) cylinder, without compacting, an apparent volume between 50 ml and 100 ml is introduced, weighted [M] with 0.1% accuracy. The powder sample is leveled carefully without compacting, if necessary, and the apparent unsettled volume [V$_0$] is read to the nearest graduated unit.

The cylinder containing the sample was mechanically tapped by raising the cylinder and allowing it to drop under its own weight using a suitable tapped density tester (e.g. JV1000; Fa. Copley) that provides a fixed drop of 3 mm plus/minus 10% at a nominal rate of 250 drops per minute. The cylinder was initially tapped 500 times and the tapped volume [V$_a$] was measured to the nearest graduated unit. The tapping was repeated for an additional 750 times and the tapped volume [V$_b$] was measured to the nearest graduated unit. If the difference has to be incrementally repeated of 1250 taps, as needed, until the volume difference between succeeding measurements is less than 2%. This final tapped volume [V$_{tapped}$] was considered for the calculation of the tapped density. The tapped density was calculated in gram per milliliter [g/ml], by the formula:

$$\rho_{tapped} = \frac{M}{V_{tapped}}$$

Hausner Factor

The Hausner factor was calculated as the quotient of Tapped density/Bulk density.

Particle Size-/Particle Size Distribution-Measurement

Light Diffraction

The determination of the particle size was performed according to the United States Pharmacopeia 36 (USP) chapter <429> and the European Pharmacopeia 7.0 (EP) chapter 2.9.31. The particle size distribution was determined utilizing a laser scattering instrument (e.g. Fa. Sympatec GmbH, type HELOS equipped with RODOS dry dispersing unit). The laser diffraction method is based on the phenomenon that particles scatter light in all directions with an intensity pattern that is dependent on particle size. A representative sample, dispersed at an adequate concentration in a suitable liquid or gas, is passed through the beam of a monochromic light source usually from a laser. The light scattered by the particles at various angles is measured by a multi-element detector, and numerical values relating to the scattering pattern are then recorded for subsequent analysis. The numerical scattering values are then transformed, using an appropriate optical model and mathematical procedure, to yield the proportion of total volume to a discrete number of size classes forming a volumetric particle size distribution (e.g. D50 describes a particle diameter corresponding to 50% of cumulative undersize distribution).

Dry samples were transferred into aerosols through the use of powder dispersers, which apply mechanical forces for de-agglomeration. The dosing device feeds the disperser with a constant mass flow of sample. The disperser utilizes the energy of compressed gas (e.g. 2 bar) or the differential pressure to a vacuum (e.g. 90-100 mbar) to disperse the particles. The required precision of the method is dependent on characteristics of the sample material (milled versus non-milled, robust vs. fragile). Appropriate measurement conditions are experimentally established, in relation to the desired precision. At least a triplicate detection of representative samples was conducted. The repeatability of the particle size distribution parameter was as follows: for any central value of the distribution (e.g. median D50) the coefficient of variation was less than 10%. For values away from the median, (e.g. D10 and D90) the coefficient of variation did not exceed 15%. Below a particle size of 10 μm the coefficient of variation was doubled.

The average water content was calculated as average of the duplicate determination. The water content values are expressed herein as % by weight/weight (w/w)

Loss on Drying (LOD)

The water content was determined according to the United States Pharmacopeia 36 (USP) chapter <921>, Method III and procedure for chemicals—proceed as directed in the individual monograph preparing the chemical as directed under Loss on Drying (LOD)<731> and also according European Pharmacopeia 7.0 (EP) chapter 2.2.32. However, this method suffers from the drawback that it determines not only the water content, but also other volatile constituents in the sample The detection of the water content via gravimetric method was performed with a halogen moisture analyzer (e.g. Fa. Mettler Toledo, Type HG63). This kind of equipment is working according to the thermo-gravimetric principle. That means the water content is analyzed via the surrogate parameter of detected weight loss while heating a water containing sample.

At the beginning of the detection, the sample was placed on an aluminum bowl and the net weight of the sample was detected considering the tare weight of the aluminum bowl. If the sample shows a mean particle size more than 2 mm the sample should be crushed, however, avoiding too much energy uptake of the sample to avoid water loss during the sample preparation. The required sample weight depends on the desired deviation of the reproducibility.

| Reproducibility of Results | Minimum sample Weight |
| --- | --- |
| ±0.02% | 10 g |
| ±0.05% | 4 g |
| ±0.1% | 2 g |
| ±0.2% | 1 g |

Then, the sample was be heated up to 110° C. and kept at this temperature during the detection period utilizing the halogen heating module of the halogen moisture analyzer. The moisture will become volatile and the precision balance will detect a sample weight loss. The sample was dried until a constant mass was observed as predefined by a sample weight loss of less than 1 mg per 50 sec (e.g. Fa. Mettler Toledo, Type HG63; switch off criteria 3).

The analysis of the gravimetric detected water content utilized the following equation:

$$MC = \frac{m_w - m_D}{m_w} \cdot 100$$

$$DC = \frac{m_D}{m_w} \cdot 100$$

MC=Content of volatile constituents [%]
DC=Dry content [%]
$m_w$=Wet sample mass [g]
$m_d$=Dry sample mass [g]

The water content values are expressed herein as % by weight/weight (w/w)

Examples C1, C2 and 3

Example C1 (Comparative)

Step a) Filling

About 5 kg of EUDRAGIT® FS 30 D were poured into aluminium bowls (trays) with a dimension of width 67 cm depth 55 cm height 3 cm which result into a volume/surface relation 1.4 [g/cm²]. The aluminium trays were covered with a cover plate. This filling process step was repeated six times. Filling was conducted in a cold storage house. The cover plates were partly perforated and sealed with a Betamesh® stainless steel filter screen Step b) Freezing The freezing of the aluminium trays took place in a cold storage house. The time for deep freezing to minus 30° C. product temperature was set over night (at least 8 hours). The frozen trays were transferred into the freeze drier (G 06-3).

Step c) Freeze Drying

Freeze-drying was conducted at a pressure of 1 mbar during the entire drying process. The adjusted product temperature of 80° C. was effected by IR heating elements. The product temperature was keep constant at 80° C. during the first 6 hours of drying. Afterwards a continuous reduction of the temperature was set until a product temperature of 20° C. The total process time was between 16 to 20 hours.

Step d) Obtaining the Freeze-Dried Product

After venting to atmospheric pressure the trays were removed from the freeze dryer, the tray covers were removed and the freeze-dried product was obtained. The powder obtained had a clearly sintered and rough structured appearance.

Step e) Loosen Up

The clearly sintered and rough structured product was manually sieved with a Kressner sieve and a sieve insert of 1400 μm. A sieve analysis showed a particle size distribution of D10 about 90 μm; D50 about 210 μm; D90 about 450 μm and particles smaller than 1 mm of 94- to 98%. Furthermore, the final product had a residual moisture content (LOD) of less than 1%.

Cleaning

The cleaning of the bowls or drying trays was done with slight alkaline detergents slightly above the dissolution pH of the polymer. The freeze-dried polymer product obtained from EUDRAGIT® FS 30 D starts to dissolve in aqueous media at a pH value of about 7 or slightly above. Due to the slightly acidic behaviour of the dispersion and the alkaline detergents, the trays show after short production period abrasion and erosion which will not accompany with GMP production.

Example C2 (Comparative)

Step a) Filling 4.3 kg of EUDRAGIT® FS 30 D were pumped into bowls (trays) with a peristaltic pump. The trays were not covered with a cover plate. This filling process step was repeated 112 times. Filling was conducted directly in the freeze dryer.

Step b) Freezing

The freezing of the bowls (trays) were conducted in the freeze dryer. The time for deep freezing to minus 30° C. product temperature was set over night (at least for 8 hours).

Step c) Freeze-Drying

The freeze-drying was conducted at 0.8 to 0.17 mbar during the complete drying process. The adjusted product temperature profile was set to 10° C. for 2 h followed by 16° C. for 2 h followed by 21° C. for 4 h followed by 27° C. for 4 h followed by 35° C. for 20 h. Cool down to 20° C. product temperature before removal of the product. The total process time was 45 hours. The energy transfer was done via floor space heating.

Step d) Obtaining the Freeze-Dried Polymer Powder from the Bowls

After venting to atmospheric pressure, the trays were removed from the dryer and the freeze-dried polymer powder was obtained. The powder obtained had an uneven appearance with wet zones inside.

Step e) Loosen Up

Due to the uneven and inhomogeneous particle shape and the high residual water content, a sieving step was not conducted. The product showed wet powder stains in the dry bowls (trays). This also leads to an inhomogeneous LOD of 0.5 to 1.5%. A water content of more than 1% causes instability of the powder product.

Example 3 (Inventive)

Step a) Filling 5 kg of EUDRAGIT® FS 30 D were poured into stainless steel bowls (trays) with a dimension of length 60 cm width, 41 cm, height 3 cm which result into a volume/surface relation 2.0 [g/cm2]. The stainless steel bowls (trays) were covered with a stainless steel cover plate consisting of a stainless steel frame covered with a Betamesh® stainless steel filter sieve. This filling process step was repeated seven times. Filling was conducted directly in the freeze-dryer.

Step b) Freezing

The freezing of the stainless steel trays took place directly in the freeze-dryer Zirbus® Sublimator® 4*5*6. The time for deep freezing to minus 40° C. product temperature, at least minus 38° C. product temperature was set to 4 to 6 hours.

Step c) Freeze Drying

The freeze-drying was conducted in several steps. An adjusted product temperature profile was set to 40° C. for 200 min at 0.5 mbar followed by 40° C. for 200 min at 0.4 mbar followed by 40° C. for 400 min at 0.3 mbar followed by 40° C. for 200 min at 0.2 mbar followed by 40° C. for 100 min at 0.1 mbar. The last step was repeated until the product was deemed to be dry (LOD less than 1%, proven by a pressure raise test). The energy transfer was done via floor space heating. The total process time was about 42 hours. Cool down to 20° C. product temperature before removal of the product.

Step d) Obtaining the Freeze-Dried Polymer Powder from the Bowls

After venting to atmospheric pressure throughout of 0.2 µm sterile air filter, the trays were removed from the dryer, the tray covers were removed and the freeze-dried polymer product was obtained. The powder obtained had a dry and homogenous appearance.

Step e) Loosen Up

The dry and homogenous powder product was sieved with an Erweka® AR 403 sieve device and a sieve insert of 630 µm. A sieve analyses showed a particle size distribution of D10 about 15 to 20 µm; D50 about 60 to 70 µm; D90 about 160 to 170 µm and particles smaller than 1 mm of 99%. Furthermore, the final product had a residual moisture content (LOD) of less than 1%. The determined Hausner Factor of 1.25 as function of bulk and tapped density proved the good flow properties of the product.

Cleaning: The dry trays were cleaned with a slightly alkaline cleaning agent slightly above the solution pH value of the polymer. The freeze-dried polymer powder product obtained from EUDRAGIT® FS 30 D starts to dissolve in aqueous media at a pH value of about 7 or slightly above. The stainless steel trays an cover showing best resistance to the polymer and the detergents.

Results: The product obtained in Example C1 (comparative) was dry but strongly and uneven sintered, therefore unusable. The D50 particle size is out of the specified range for applications. This may be due to the insufficient and uncontrolled freezing temperatures of only minus 30° C. and the much too high freeze-drying temperature of 80° C. at the beginning of the freeze-drying process.

In Example C2 (comparative) the particle size of the obtained product is much too high. The product is uneven with wet spots inside (LOD=0.5-1.5, only partially 1.0 or less). High water contents directly causes instability of the product during storage. The product is unusable and shows a strong tendency to form unbreakable lumps. This is apparently due to the insufficient freezing temperature of only minus 30° C. and an incomplete drying performance.

The product obtained in Example 3 (inventive) is a dry even product, which is suitable for pharmaceutical applications with homogenous particle size distribution.

The invention claimed is:

1. A process for preparing a polymer powder with a D50 particle size from 40 to 200 µm and a Hausner factor of 1.25 or less, from an aqueous polymer dispersion comprising 15 to 50% by weight of a polymer polymerized from 10 to 30% by weight of methyl methacrylate, 50 to 70% by weight of methyl acrylate, and 5 to 15% by weight of methacrylic acid, the process comprising:

TABLE 1

|  | Example C1 (comparative) | Example C2 (comparative) | Example 3 (inventive) |
| --- | --- | --- | --- |
| Equipment | Freeze dryer G 06-3 | Freeze dryer 2 | Zirbus ® Sublimator 4*5*6 |
| Dispersion per bowl | 5000 g | 4300 g | 5000 g |
| Bowl material | Aluminium | n/n | Stainless steel |
| Covering | With Betamesh ® 50 | Without (directly causes particle contamination in the freeze dryer) | With Betamesh ® 50 |
| Volume/surface relation [g/cm$^2$] | 1.4 | n/n | 2.0 |
| Freezing temperature | −30° C. | −30° C. | −40° C. |
| Freezing time | Over night | Over night | 3-6 h |
| Vacuum at freeze drying | 1 mbar | 0.8-0.17 mbar | 0.5-0.1 mbar |
| Trays | 6 | 112 | 7 |
| Dispersion per bowls | 5000 g | 4300 g | 5000 g |
| Heating type in the freeze drying chamber | Infrared | Floor space heating | Floor space heating |
| Temperature at freeze drying | Ramp 80° C. for ~6 h followed by a decrease to 20° C. during the remaining process time | 10° C. 2 h<br>16° C. 2 h<br>21° C. 4 h<br>27° C. 4 h<br>35° C. 20 h<br>Cool down to 20° C. before removal of the product | Constant 40° C. Cool down to 20° C. before removal of the product |
| Freeze drying time | ~16-20 h | 45 h | about 42 h |
| Particle size | D10 about 90 µm<br>D50 about 210 µm<br>D90 about 450 µm<br><1 mm 94-98% | Large particles about <4 mm | D10 about 15-20 µm<br>D50 about 60-70 µm<br>D90 about 160-170 µm<br><1 mm >99% |
| LOD | <1% | 0.5 to 1.5 | <1% |
| Comments | Product dry but strongly and uneven sintered | Uneven product with wet zones inside | Dry even product |
| Tapped density [g/ml] | 0.5 | n/n | 0.5 |
| Bulk density [g/ml] | 0.4 | n/n | 0.4 |
| Hausner factor | <1.25 | n.d. | <1.25 | a) filling the aqueous polymer dispersion in one or more bowls with a volume/surface relation from 0.5 to 3.0 g/cm$^2$, b) freezing the one or more bowls filled with the aqueous polymer dispersion to a temperature of minus 35 to minus 50° C., c) freeze drying the frozen aqueous polymer dispersion in the bowls to a powder at a vacuum in the range of about 3 to 0.05 mbar and at a temperature in the range from about 20° C. and up to no more than the glass transition temperature Tg of the polymer, until the water is removed to a LOD of 1% or less, d) obtaining the freeze dried polymer powder from the one or more bowls, and e) loosening up the freeze-dried polymer powder, by passing through a sieve to obtain the polymer powder with a D50 particle size from 40 to 200 μm and a Hausner factor 1.25 or less.

2. The process according to claim 1, wherein the polymer is polymerized from 20 to 30% by weight of methyl methacrylate, 60 to 70% by weight of methyl acrylate, and 8 to 12% by weight of methacrylic acid.

3. The process according to claim 1, wherein the polymer is polymerized from 25% by weight of methyl methacrylate, 65% by weight of methyl acrylate, and 10% by weight of methacrylic acid.

4. The process according to claim 3, wherein the freeze drying temperature in c) is in the range from 35 to 42° C.

5. The process according to claim 1, wherein the one or more bowls have geometrical dimensions of about 20 to 100 cm in length, 20 to 100 cm in width, and 2 to 10 cm in height.

6. The process according to claim 1, wherein the bowls are made of steel.

7. The process according to claim 1, wherein the bowls are covered at least in b) or c) or both with a mesh, with a mesh width of about 10 to 10 μm.

8. The process according to claim 1, wherein at least c) is performed in a freeze-drying chamber.

9. The process according to claim 8, wherein heating of the freeze-drying chamber is effected by integrated floor space heating equipment or by an infrared heat equipment.

10. The process according to claim 1, wherein the sieve in e) has a mesh width from about 300 to 1000 μm.

11. A polymer powder obtained by the process according to claim 1.

12. The polymer powder according to claim 11, wherein the polymer powder has a particle size D10 of 10 to 25 μm, D50 of 40 to 100 μm, and D90 of 120 to 180 μm.

13. The polymer powder according to claim 11, wherein a tapped density is from 0.45 to 0.55 g/ml.

14. The polymer powder according to claim 11, wherein a bulk density is from 0.35 up to less than 0.45 g/ml.

15. The polymer powder according to claim 11, wherein the polymer powder has a Hausner factor from 1.1 to 1.25.

16. The process according to claim 1, wherein the polymer powder has a D50 particle size from 45 to 120 μm.

17. The process according to claim 1, wherein the one or more bowls have a volume/surface relation from 1 to 2.5 g/cm$^2$.

18. The process according to claim 1, wherein the freezing of the one or more bowls filled with the aqueous polymer dispersion is at a temperature of minus 38 to minus 45° C.

19. The process according to claim 1, wherein the freeze drying of the frozen aqueous polymer dispersion is performed at a vacuum in the range of about 0.8 to 0.1 mbar.

20. The process according to claim 7, wherein the mesh is a metal mesh.

* * * * *